Apr. 24, 1923.
R. K. THOMSON
1,453,209
SIDE CURTAIN FOR AUTOMOBILES
Filed June 28, 1920    2 Sheets-Sheet 1
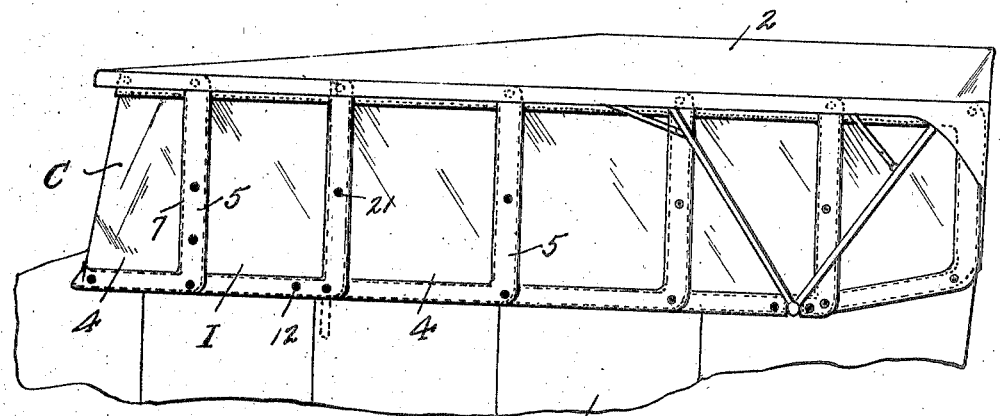
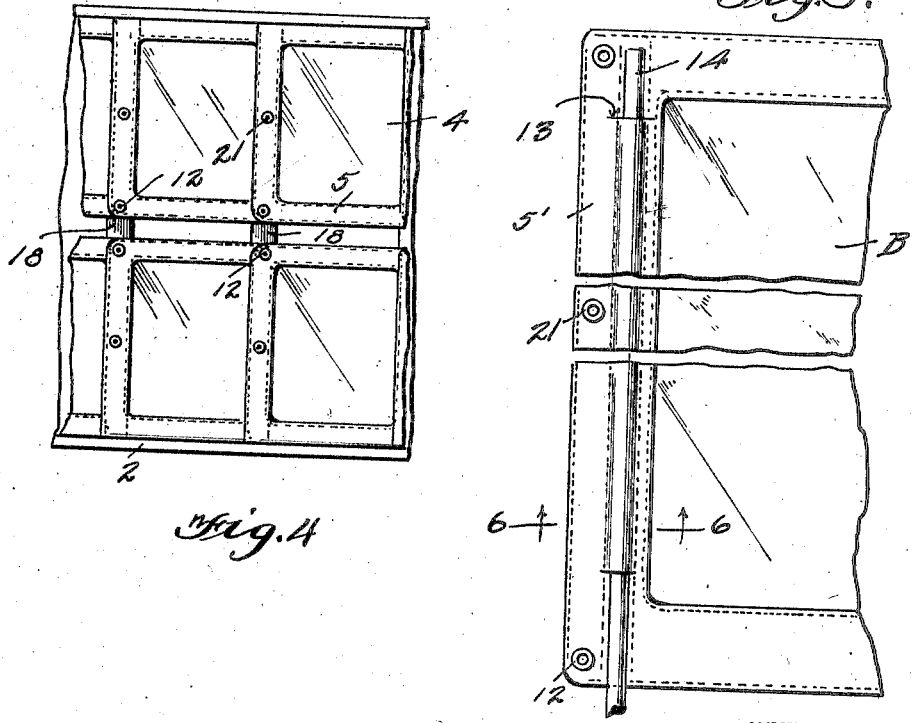
INVENTOR.
Ralph K. Thomson
BY
Richard B. Owen,
ATTORNEY.

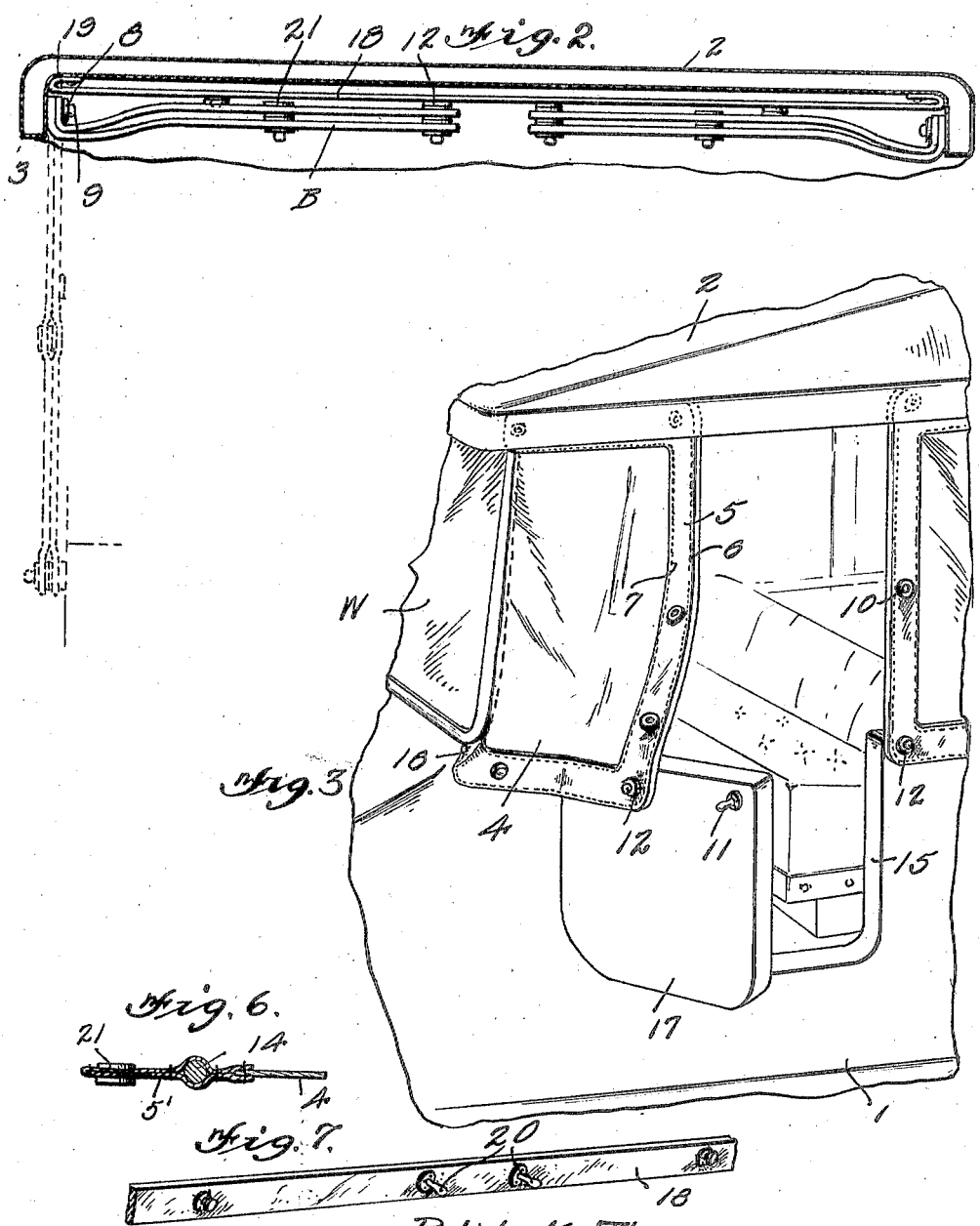

Patented Apr. 24, 1923.

1,453,209

UNITED STATES PATENT OFFICE.

RALPH K. THOMSON, OF SIOUX FALLS, SOUTH DAKOTA.

SIDE CURTAIN FOR AUTOMOBILES.

Application filed June 28, 1920. Serial No. 392,229.

*To all whom it may concern:*

Be it known that I, RALPH K. THOMSON, a citizen of the United States, residing at Sioux Falls, in the county of Minnehaha and State of South Dakota, have invented certain new and useful Improvements in Side Curtains for Automobiles, of which the following is a specification.

This invention relates to automobile side curtains and means for supporting the same in conjunction with automobiles and has for its object the production of a simple and efficient securing means therefor whereby the curtain may be either supported in an operative or an inoperative position.

Another object of this invention is the production of a simple and efficient means for supporting and bracing the curtain at a point adjacent the front door of the automobile or other vehicle upon which the curtain is mounted.

With these and other objects in view, this invention consists of certain novel constructions, combinations and arrangement of parts as will be hereinafter fully described and claimed.

In the drawings:—

Figure 1 is a side elevation of a portion of the body of the automobile showing the side curtains applied thereto.

Figure 2 is a transverse sectional view through the top of an automobile showing the curtains in an inoperative or folded position.

Figure 3 is a fragmentary perspective view of a portion of the front of an automobile showing the curtains supported thereto arranged around the front door of the vehicle or automobile.

Figure 4 is a bottom plan view of a portion of the top of an automobile showing the supporting strips and position of the curtains when swung to an inoperative position under the top of the automobile.

Figure 5 is an enlarged side elevation of part of the same being broken away of the curtain which is adapted to be placed adjacent the front door of the car by showing the supporting pintle carried thereby.

Figure 6 is a transverse sectional view taken on the line 6—6 of Figure 5, and

Figure 7 is a fragmentary perspective view of a portion of the curtain supporting strap which is adapted to be supported under the top of the automobile cover.

By referring to the drawings it will be seen that 1 designates the body of the car which of course may be made of any suitable design or structure without departing from the spirit of the invention. The cover 2 or top 2 is supported in any suitable or desired manner upon the body 1 of the car and this top 2 is provided with downwardly turned edges 3 which constitute means for suspending or hanging the curtains from the top of the machine. The curtains are indicated in general by C and are preferably formed of a plurality of sections and consist of a transparent body 4 and a fabric reinforcing frame 5. This fabric reinforcing frame 5 may be formed of any suitable or desired material such as leather or other suitable material may be employed without departing from the spirit of the invention. The frame 5 is stitched along its outer edges and inner edges 7 to reinforce the same, the stitches 7 constituting a medium for also securing the transparent body 4 to the frame 5. Each curtain is of substantially the same construction. These curtains are adapted to be secured so as to have the rear edge of the forward curtain overlap the front edge of the next adjoining curtain such as illustrated clearly in Figure 1, in this way constituting an efficient closure for the body of the automobile. This curtain is provided with a plurality of eyelets 8 along the upper edge thereof, which eyelets are adapted to receive the securing pins 9 of a suitable construction, these pins 9 constituting hangers for the curtains. Suitable eyelets 10 are also formed along the side edges of the curtains for facilitating the securing of the adjoining curtains together both when in an operative and inoperative position. These eyelets may be arranged in any suitable or desired manner along the edge of the curtain for obtaining the desired result and suitable pins 11 are carried upon the body of the car 1 at suitable intervals for the purpose of fitting through the securing eyelets 12 formed along the lower edges of the curtains These pins 11 are adapted to firmly secure the lower edges of the curtains in engagement with the car and prevent the same from becoming accidentally detached therefrom Attention is now called particularly to Figures 1 and 5 of the drawing wherein a bracing means is employed in conjunction with one of the curtains indicated in general by the letter B. This curtain B is provided with a channel portion 13 which receives a bracing pin or pintle 14. This channel portion 13 is formed by slitting the frame 5' of the curtain B near the respective ends thereof upon one side edge and the pintle pin 14 is then passed through the slit end and longitudinally of the channel between the outer and inner layers of the frame 5'. This pintle pin 14 has its respective edges thereof projecting for a sufficient distance so that the respective ends of the pin 14 may rest or bear against the inner face of the cover or top 2 and the inner face of the body 1. In this way a very efficient reinforcing means will be produced for reinforcing the edge of the curtain which is located directly in rear of the front door opening 15 of the automobile body 1.

By considering Figure 3 it will be seen that the front curtain upon each side of the machine is so arranged as to have the forward edge 16 placed under the side edge of the wind-shield W. In Figure 3 the intermediate curtain between the front curtain and the curtain indicated by the numeral B is shown removed for the purpose of showing the connection means between the front curtain and the body and top of the automobile and the curtain B and the body and top of the automobile. This intermediate curtain I is supported in a similar manner to the remaining curtain as clearly shown in Figure 1. This curtain I however may not be used in connection with the side curtains. However when the curtain I is used, the same may be readily secured or removed out of engagement with the door for the purpose of permitting the door 17 to be opened and closed at the desire of the operator.

It is of course desirous at certain times to extend the curtains to an inoperative position and in this way permit the sides of the car to be entirely open or free from enclosure. Consequently a supporting strap 18 is employed for this purpose. It of course should be understood that any suitable or desired number of straps may be used and these straps 18 extend transversely across the bottom face of the top 2 of the car and have their respective ends 19 secured to the under face of the top 2 as clearly shown in Figure 2 of the drawings. This strap 18 is provided with a plurality of securing pins 20 formed on the under face thereof, which pins 20 extend through the respective eyelets 21 formed along the sides of the curtains and also through the lower eyelets 12 which are located in the lower corners of the respective curtains. The position of the curtains will be clearly seen by considering Figure 2 when in an inoperative position. It of course should be understood that the manner of supporting the curtains will permit the same to be readily swung to an inoperative position or to an operative position at the will of the operator.

It of course should be understood that certain detailed changes in the mechanical construction may be employed without departing from the spirit of the invention provided these changes fall within the scope of the appended claim.

What is claimed is:—

The combination with a vehicle having a top provided with a supporting frame and having a body on which said supporting frame rests, curtain securing pins located upon the supporting frame and body of the vehicle, a curtain comprising a plurality of sections each provided with socket members located along the edges thereof engageable over said pins, said sections overlapping at their adjacent edges, and transverse straps each extending across the under side of the top from a point opposite the overlapping edges of a respective pair of curtain sections to the point opposite the overlapping edges of the corresponding curtain sections on the opposite side of the vehicle and being free from engagement with the top intermediate its ends to permit the transverse straps to freely vibrate with the curtains, said straps being provided with downwardly extending curtain securing pins corresponding to the pins on the body in the frame whereby said curtains may be secured without rolling or folding in a flat position beneath the vehicle top.

In testimony whereof I affix my signature in presence of two witnesses.

RALPH K. THOMSON.

Witnesses:
B. P. SCHLOSSER,
G. B. THOMSON.